United States Patent
Smyth et al.

(10) Patent No.: US 11,310,271 B2
(45) Date of Patent: Apr. 19, 2022

(54) USING SECURE WEB SOCKETS TO EXTEND REACH OF CONDITIONAL ACCESS SYSTEMS

(71) Applicant: ARRIS Enterprises, LLC, Suwanee, GA (US)

(72) Inventors: Luke Smyth, Belfast (IE); Derek Gilmore, Belfast (IE)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/795,235

(22) Filed: Feb. 19, 2020

(65) Prior Publication Data
US 2020/0267185 A1 Aug. 20, 2020

Related U.S. Application Data

(60) Provisional application No. 62/808,260, filed on Feb. 20, 2019.

(51) Int. Cl.
*H04L 29/06* (2006.01)
*H04L 29/08* (2006.01)
(Continued)

(52) U.S. Cl.
CPC .......... *H04L 63/168* (2013.01); *H04L 63/166* (2013.01); *H04L 67/02* (2013.01);
(Continued)

(58) Field of Classification Search
CPC ....... H04L 67/02; H04L 67/42; H04L 63/168; H04L 63/166; H04L 63/102; H04L 63/0236; H04L 69/162; H04L 69/329
See application file for complete search history.

(56) References Cited

U.S. PATENT DOCUMENTS

| 7,349,886 B2 * | 3/2008 | Morten | H04L 63/06 |
| | | | 705/50 |
| 10,326,797 B1 * | 6/2019 | Murray | G06Q 20/3227 |

(Continued)

OTHER PUBLICATIONS

International Search Report and Written Opinion Re: Application No. PCT/US2020/018985.

(Continued)

*Primary Examiner* — El Hadji M Sall
(74) *Attorney, Agent, or Firm* — Chernoff, Vilhauer, McClung & Stenzel, LLP

(57) ABSTRACT

A system and method for securely and bi-directionally transmitting information including conditional access private data between a client and a headend is disclosed. In an exemplary embodiment, the method includes: establishing a hypertext transfer protocol secure (HTTPs) connection, establishing a hypertext transfer protocol secure (HTTPs) connection; upgrading the HTTPs connection to a persistent bi-directional connection, accepting a first message from a client via the web socket connection, wherein the first message comprises an identifier of the client, parsing the message for the identifier of the client, associating the identifier of the client with the secure web socket connection, and transmitting a second message notifying the headend of the secure web site that connection, the message comprising the identifier of the client.

14 Claims, 5 Drawing Sheets

(51) Int. Cl.
   *H04L 67/02* (2022.01)
   *H04L 69/16* (2022.01)
   *H04L 67/01* (2022.01)
   *H04L 69/329* (2022.01)

(52) U.S. Cl.
   CPC ............ *H04L 67/42* (2013.01); *H04L 69/162* (2013.01); *H04L 69/329* (2013.01)

(56) References Cited

U.S. PATENT DOCUMENTS

| | | |
|---|---|---|
| 2003/0097655 A1 | 5/2003 | Novak |
| 2009/0150966 A1 | 6/2009 | Alao et al. |
| 2010/0218214 A1* | 8/2010 | Fan .................. H04N 21/41265 725/46 |
| 2010/0266123 A1 | 10/2010 | Tao |
| 2014/0282784 A1 | 9/2014 | Pfeffer et al. |
| 2015/0271233 A1* | 9/2015 | Bouazizi .......... H04N 21/44209 709/219 |
| 2018/0070152 A1* | 3/2018 | Yang ................... H04N 21/236 |

OTHER PUBLICATIONS

Fette et al. "The websocket protocol", Internet Engineering Task Force (IETF), Dec. 2011. Retrieved on Apr. 15, 2020 (Apr. 15, 2020) from <URL: https://tools.ietf.org/pdf/rfc6455.pdf> entire document.

Schackow. "Introduction to WebSockets on Windows Azure Web Sites" In: Microsoft Azure. Nov. 14, 2013. Retrieved on Apr. 15, 2020 (Apr. 15, 2020) from < URL: https://azure.microsoft.

* cited by examiner

USING SECURE WEB SOCKETS TO EXTEND REACH OF CONDITIONAL ACCESS SYSTEMS

CROSS-REFERENCE TO RELATED APPLICATIONS

This application claims benefit of U.S. Provisional Patent Application No. 62/808,260, entitled "USING SECURE WEB SOCKETS TO EXTEND REACH OF CONDITIONAL ACCESS SYSTEMS," by Luke Smyth and Derek Gilmore, filed Feb. 29, 2019, which application is hereby incorporated by reference herein.

BACKGROUND

1. Field

The present disclosure relates to systems and methods for transceiving data, and in particular to a system and method for transceiving data by at the persistent and secure bi-directional link.

2. Description of the Related Art

Systems for securely transmitting content to remote locations are known in the art. Such systems include conditional access systems (CAS), and digital rights management (DRM) systems. Generally, a CAS protects information while in transport, while a DRM System protects content both during transport and one at rest. When an operator chooses how to deliver secure content to their subscribers, they basically have two choices: (1) deploy a traditional satellite, cable or managed IP CAS with a CA headend, or (2) the ploy eight DRM solution.

While both solutions have their benefits, each come with their own set of limitations. With regard to CA systems, traditional broadcast CA systems can only service subscribers within range of an operator's cable or satellite infrastructure, and traditional IP connected CA systems may require an operator managed network and this can be a costly investment. Anything outside of that managed network cannot avail of an operator's services. With regard to DRM Systems, they are simply not as scalable as CA systems and they operate one directionally, with a request/response model. That is, clients make requests and the DRM services them. There is no way of pushing messages to a client. For example, an operator would not be able to "push" new credentials or entitlements.

The problem therefore is developing a solution that provides an operator with a third option. This new option would provide the benefits of both CA and DRM systems, while avoiding the limitations each one brings.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for securely and bi-directionally transmitting information including conditional access private data between a client and a headend. In an exemplary embodiment, the method includes: establishing a hypertext transfer protocol secure (HTTPs) connection, establishing a hypertext transfer protocol secure (HTTPs) connection; upgrading the HTTPs connection to a persistent bi-directional connection, accepting a first message from a client via the web socket connection, wherein the first message comprises an identifier of the client, parsing the message for the identifier of the client, associating the identifier of the client with the secure web socket connection, and transmitting a second message notifying the headend of the secure web site that connection, the message comprising the identifier of the client. In one embodiment, establishing an HTTPs connection comprises transmitting an HTTPs connect message from the client to a web server. In another embodiment, the persistent bi-directional connection as a secure web socket connection. In still another embodiment, the method further comprises upstreaming the secure web socket connection to a server side application. In a still further embodiment, the first message further comprises a state of the client and the second message further comprises the state of the client. In still another embodiment, a server side application manages the secure web socket connection. Finally, the method can be used to transceive information. For example, the method may further comprise receiving an entitlement request via the secure web socket connection, looking up the identifier of the client based upon the secure web socket connection, providing the entitlement request received via the secure web socket connection and the identifier of the client to the headend, receiving an entitlement response from the headend, looking up the secure web socket connection based upon the identifier of the client, and providing the entitlement response to the client via the secure web socket connection.

Another embodiment is evidenced by a processor and a memory communicatively coupled to the processor, the memory comprising processor instructions including instructions for performing the above operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

A standard protocol known as Secure Web Sockets is used to establish a persistent bi-directional link (such as a secure web socket) between a CA headend and a population of client devices such as set top boxes (STBs) connected via the Internet. This persistent bi-directional link is then used for bi-directional transmission of CA private data.

An initial handshake is used two to establish a Web Socket connection, and this initial handshake is pure HTTP. This is sufficient to open a two way connection through most firewalls. If HTTPs is used in place of HTTP, the connection is encrypted. Since the connection is encrypted, no further protocol analysis can be carried out and so, to the firewall, the protocol will be indistinguishable from HTTPs. Due to this, CA private data can be delivered over the internet via a Web Socket, well beyond the reach of an operators infrastructure. Secure Web Sockets are upgraded HTTPs connections and therefore are able to cope with firewalls, network address translation (NAT) routers and the like, meaning that a connection can be established from anywhere.

This solution combines the benefits of both traditional CA and DRM systems, as follows. An STB (or another device) could connect to the CA headend from anywhere in the world over the internet. This gives the CA headend the reach of a DRM system. Also, unlike standard DRM, this permits bi-directional communication, meaning messages and responses may be sent or received by either the CA headend or client. Bi-directional communication allows an operator to quickly grant or revoke credentials. This is unlike standard DRM, which would permit access to protected content until issued certificates have expired. Further, the secure key structure of the CA system is retained. This provides strong protection due to the multi-level key encryption a CA typically deploys.

Previous solutions (as far as Titanium is concerned) were limited to the use of the User Datagram Protocol (UDP) over operator owned infrastructure. Given the proliferation of network address translation (NAT) firewalls on the Internet, delivery of UDP is difficult to guarantee. There are techniques such as those used by SKYPE, whereby a hole is "punched through the firewall", opening it to a limited range of incoming UDP. However, the time for which such holes persist is typically very short and so a lot of UDP traffic is required just to keep the firewall open. Such solutions cannot be made to scale well to tens or hundreds of thousands of STBs.

Content Distribution System

Figure 1:
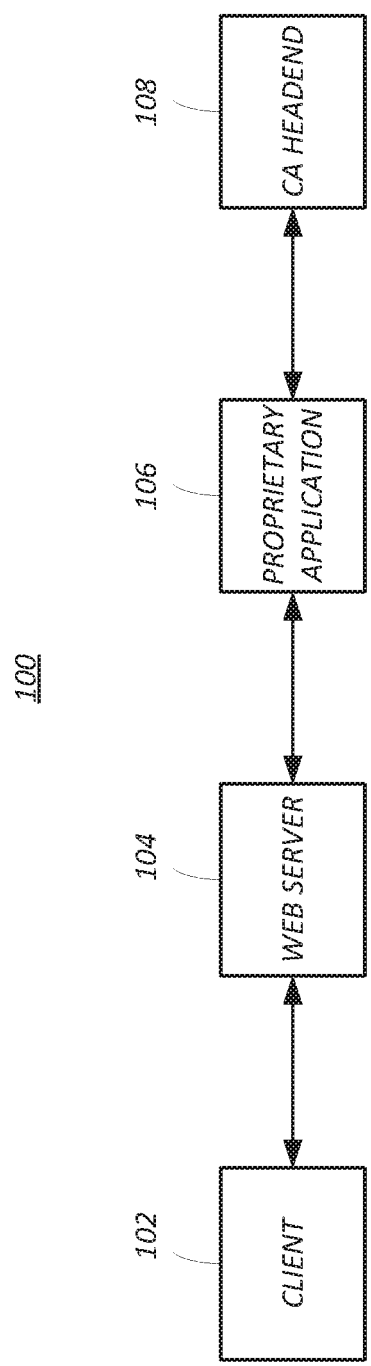
FIG. 1 is a block diagram depicting an exemplary content distribution system.

FIG. 1 is a block diagram depicting an exemplary content distribution system (CDS) 100.

The CDS 100 comprises a client 102, a web server 104, an application 106, and a conditional access (CA) headend 108. The client 102 can be manifested as an STB, a cell phone, smartphone, tablet computer, smart TV, desktop or laptop computer, or any other device capable of receiving and providing content for display or other consumption. The client 102 communicates with the other elements of the CDS 100 via the Internet using the web server 104. The web server 104 accepts requests from the client 102 and provides these requests to the CA headend 108 has managed by the application 106. The web server 104 also delivers information to the client 102 from the CA headend 108, again as managed by application 106. The application 106 operates as an enhanced messaging service, processing messages from the web server software for use by the CA headend 108 and processing messages from the CA headend 108 for use by the client 102.

The solution described below includes two elements: (1) An STB (or similar device) that uses Secure Web Sockets to establish a secure web socket with the CA headend 108. Once this secure web socket connection has been established with the CA headend 108, the STB 102 issues a 'HELLO' message. This 'HELLO' message provides STB 102 state information along with a unique identifier of the STB 102; (2) A server 104 running webserver software that is capable of functioning as a reverse-proxy. The webserver software performs SSL termination and upgrades the HTTP connection to a Web Socket connection. This upgraded Web Socket connection is then up-streamed to a proprietary application 106. This proprietary application 106 keeps the Web Socket connections open and parses the 'HELLO' messages. This allows the CA headend 108 to associate a Web Socket connection with a given STB 102. Once this association is complete, messages may be sent in either direction.

Figure 2:
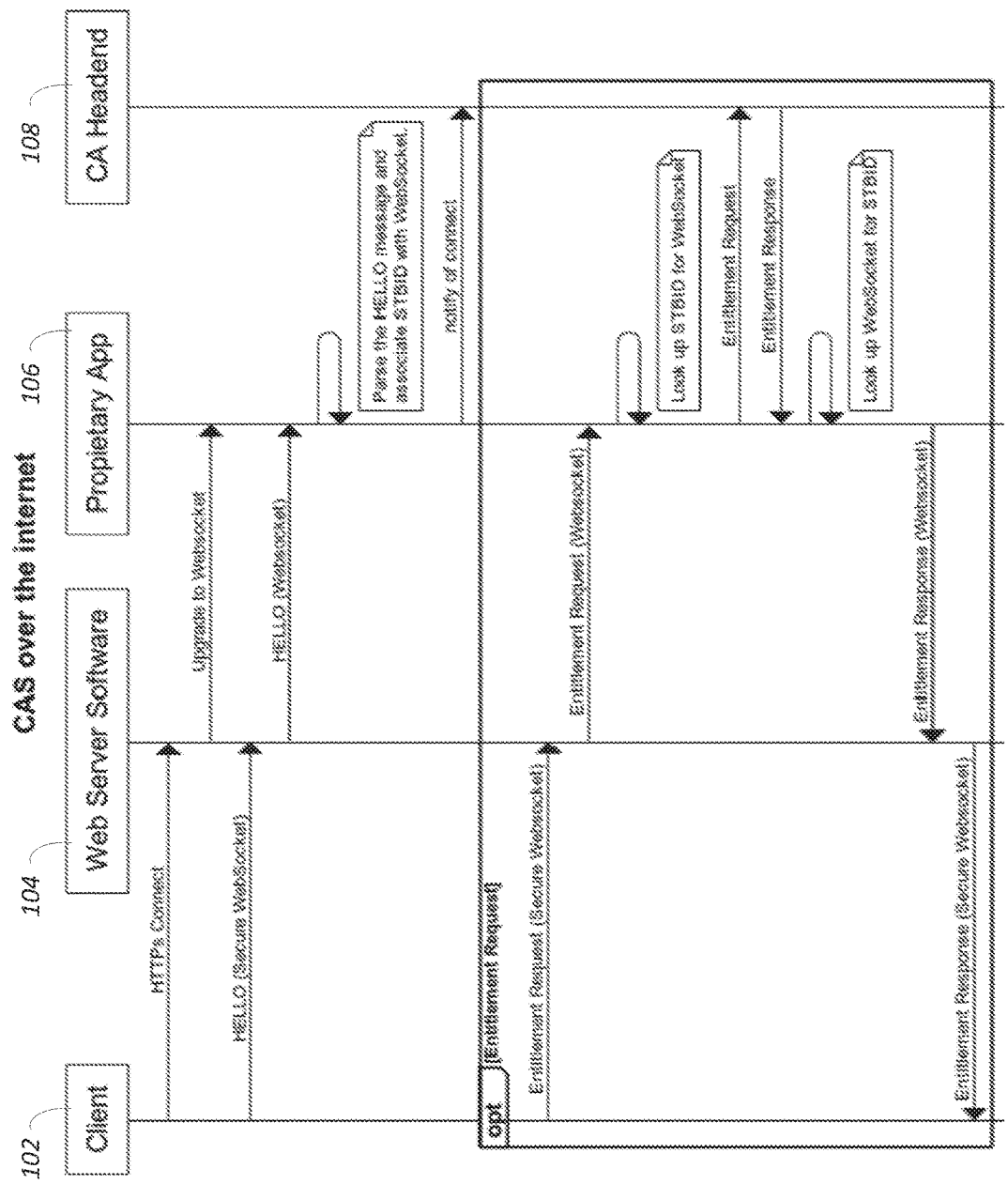
FIG. 2 is a diagram depicting an exemplary process flow for securely and bi-directionally transmitting information.

FIG. 2 is a diagram depicting an exemplary process flow for securely and bi-directionally transmitting information between the client 102 and a CA headend 108. FIG. 2 will be discussed in conjunction with FIGS. 3 and 4, which presents exemplary process steps for implementing these flows.

Figure 3:
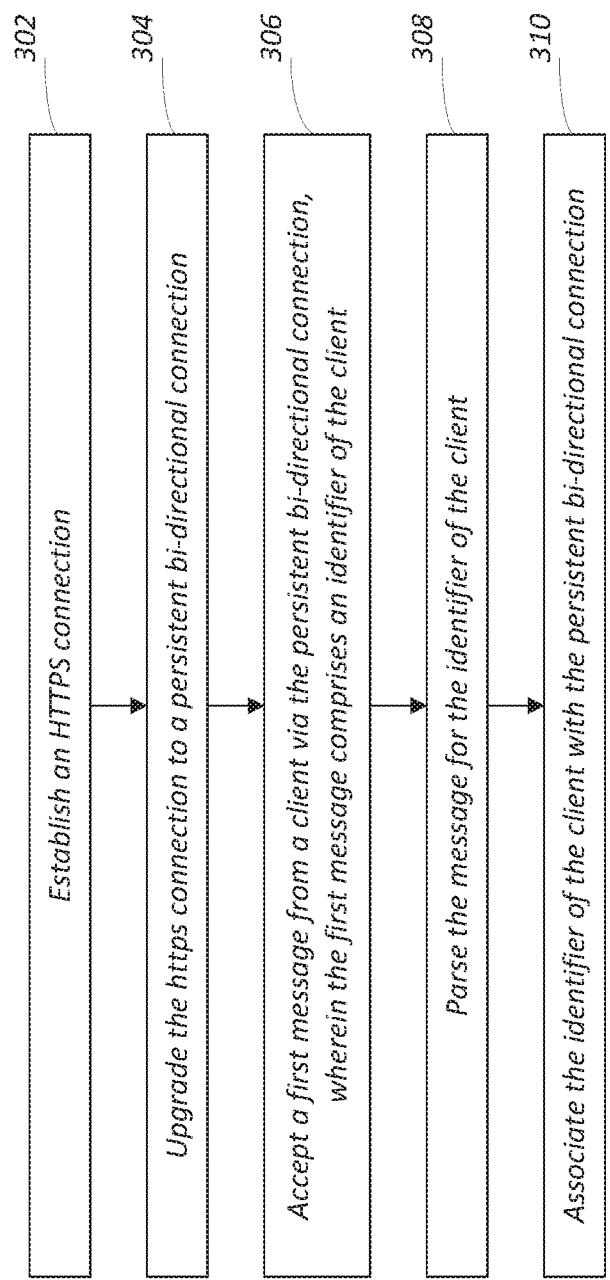
FIG. 3 is a diagram illustrating exemplary process steps to establish the secure and persistent bi-directional communications link.
Figure 4:
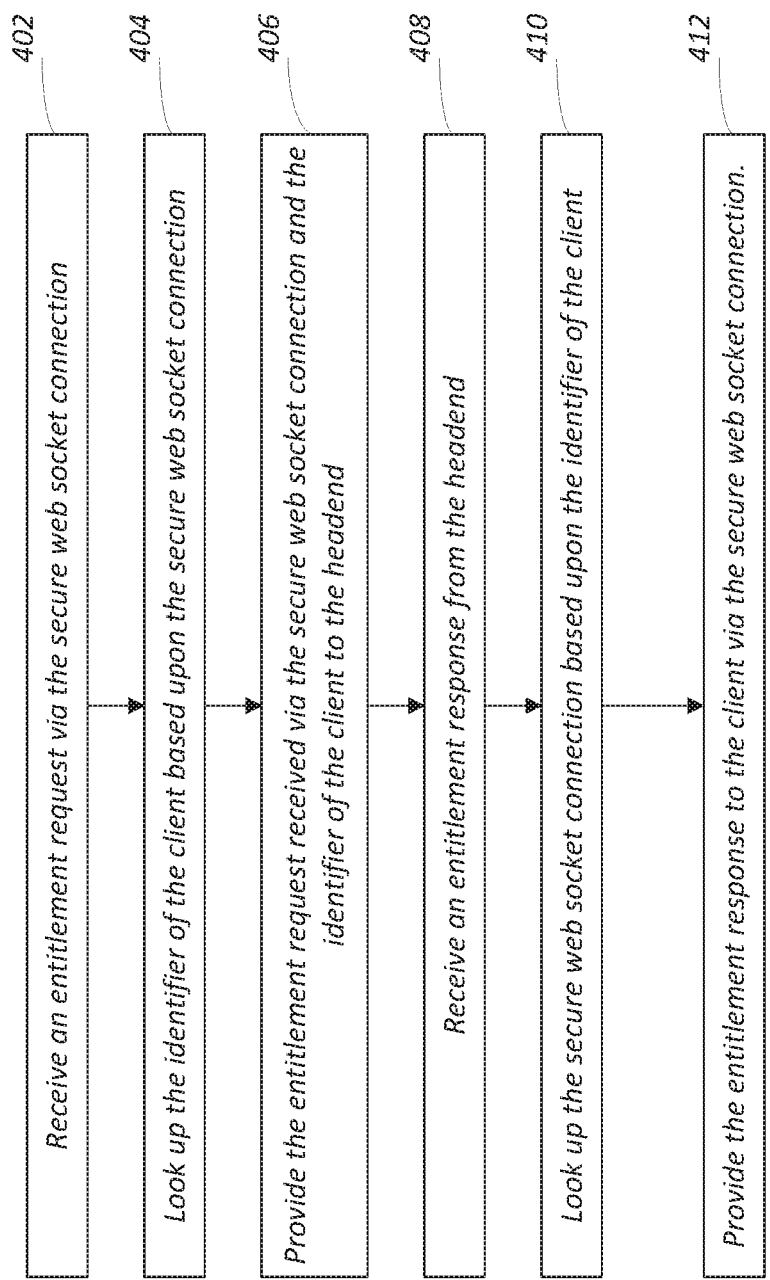
FIG. 4 is a diagram illustrating exemplary process steps use to transceive exemplary information.

FIG. 3 illustrates exemplary process steps to establish the secure and persistent bi-directional communications link, and FIG. 4 illustrates an exemplary process steps used to transceive exemplary in formation.

Referring first to FIG. 3, a Hypertext Transfer Protocol Secure (HTTPs) connection is established, as shown in block 302. As shown in FIG. 2, this can be accomplished by transmitting an "HTTPs connect" message from the client 102 to the web server 104. In one embodiment, this message includes an identifier of the client 102 (alternatively referred to hereinafter as a client identifier), and a state of the client 102.

HTTPs is an extension of the Hypertext Transfer Protocol (HTTP). HTTPs is used for secure communication over a computer network. In HTTPs, the communication protocol is encrypted using Transport Layer Security (TLS) or, formerly, its predecessor, Secure Sockets Layer (SSL). HTTPs offers authentication of the accessed web site, and protection of the privacy and integrity of the exchanged data while in transit. This protection is afforded to both outgoing and incoming communications, and is therefore bi-directional. This is accomplished by encrypting the communications between the entities using the HTTPs connection. For authentication, it is assumed that the trusted third party has signed eight digital certificate of the server side. This operation is illustrated in FIG. 2 as the HTTPs connect message between client 102 and the web server 104.

Referring again to FIG. 3, the HTTPs connection is upgraded to a persistent bi-directional connection, as shown in block 304. In one embodiment, the persistent bi-directional connection is a web socket connection, as shown in the "upgrade to web socket" activity between web server 104 and application 106. This can be performed for example by use of an "upgrade: WebSocket" command transmitted over the HTTPs connection.

Web socket is a Computer Communications protocol providing full-duplex communication channels over a single TCP connection. Like http, the web socket protocol is located in layer seven of the OSI model and depends upon TCP of layer four. The web socket protocol enables interaction between a client 102 and a web server 104 or other entity with lower overhead than half-duplex alternatives such as http polling, thus allowing real-Time Data transfer between the client 102 and the web server 104. A web socket detects the presence of a proxy server, and automatically sets up a tunnel to pass through the proxy. The tunnel is established using an http connect statement to the proxy server, which requests a proxy service to open up a TCP/IP connection to a specific host and port. Once the tunnel is set up, communication can flow unimpeded through the proxy. Since HTTPs works in a similar fashion, secure web sockets can leverage the same http connect technique.

Once the web socket is created, the application 106 monitors four events. Such events can include an open event, which indicates that a connection is established; a message event, indicating that data is received; and error event, indicating a web socket error, and a close event, indicating the connection is closed. Web socket communications consist of "frames" which our data fragments it can be sent from either side. Such frames can include text frames, which contain text data that the parties sent to each other, binary data frames, which contain binary data that the parties sent to each other, ping-pong frames, which are used to check the connection; and connection closed frames, which are used to close the connection.

Returning again to FIG. 3, a first message is accepted from the client 102 via the persistent bi-directional connection as shown in block 306. In one embodiment, the first message comprises an identifier of the client 102. This is also illustrated in FIG. 2 by the HELLO (secure web socket) message transmitted from the client 102 to the web server 104, and the passing of that message from the web server 104 to the application 106.

Returning again to FIG. 3, block 308 illustrates parsing the message for the identifier of the client 102. This is performed by the application 106, which may be implemented in the web server 104 or the CA headend 108. Next, the identifier of the client 102 is associated with the persistent bi-directional connection, as shown in block 310. This is also illustrated it will in FIG. 2. Finally, the application 106 notifies the CA headend one a weight of the web socket connection.

At this point, a secure web socket connection has been established between the client 102 and the CA headend 108. Accordingly, secure two way communication has been established between the client 102 and the CA headend one a weight that is capable of penetrating intervening proxies.

One such communication interchange includes an entitlement request transmitted from the client 102 to the CA headend 108, and resulting entitlement response transmitted from the CA headend 108 to the client 102. Referring first to FIG. 4, and entitlement request is received via the secure web socket connection as shown in block 402. This is also illustrated in FIG. 2 by the "entitlement request (secure web socket)" message from the client 102 to the web server 104, and the forwarding of this message from the web server 104 to the application 106. Referring back to FIG. 4, block 404 illustrates looking up the identifier of the client 102 based upon the secure web socket connection. This is also illustrated in FIG. 2 will as looking up the STB ID for the web socket. Next, block 406 illustrates providing the entitlement request received via the secure web socket connection and the identifier of the client 102 to the headend 108.

The CA headend 108 thereafter determines a response to the entitlement request. This response may grant the entitlement request, deny the entitlement request, and include other data supporting the response, such as data indicating the reasons for the entitlement response denial or grant. Returning to FIG. 4, and entitlement response is received from the CA headend 108. In block 410, the application 106 receives the entitlement response, and looks up the secure web socket connection based upon the identifier of the client 102. As shown in FIG. 2, this involves looking up the web socket or the STB ID. Finally, the entitlement response message is provided to the client 102 via the secure web socket connection, as shown in block 412. This is also illustrated in FIG. two as the "entitlement response (WebSocket)" message provided from the application 106 to the web server 104, and thence to the client 102. Similar procedures and protocols are employed four other conditional access-related messages, or any other data communicated between the client 102 and a CA headend 108.

In one embodiment, the foregoing systems and methods are implemented in C++11, running on a Centos 7.5 server which is also running an NGINX webserver. The NGINX webserver performs SSL termination and upstreaming to an instance of a proprietary server-side application which will then manage the Web Socket connection. This solution may be implemented using any other language and webserver, on any other operating system.

Hardware Environment

Figure 5:
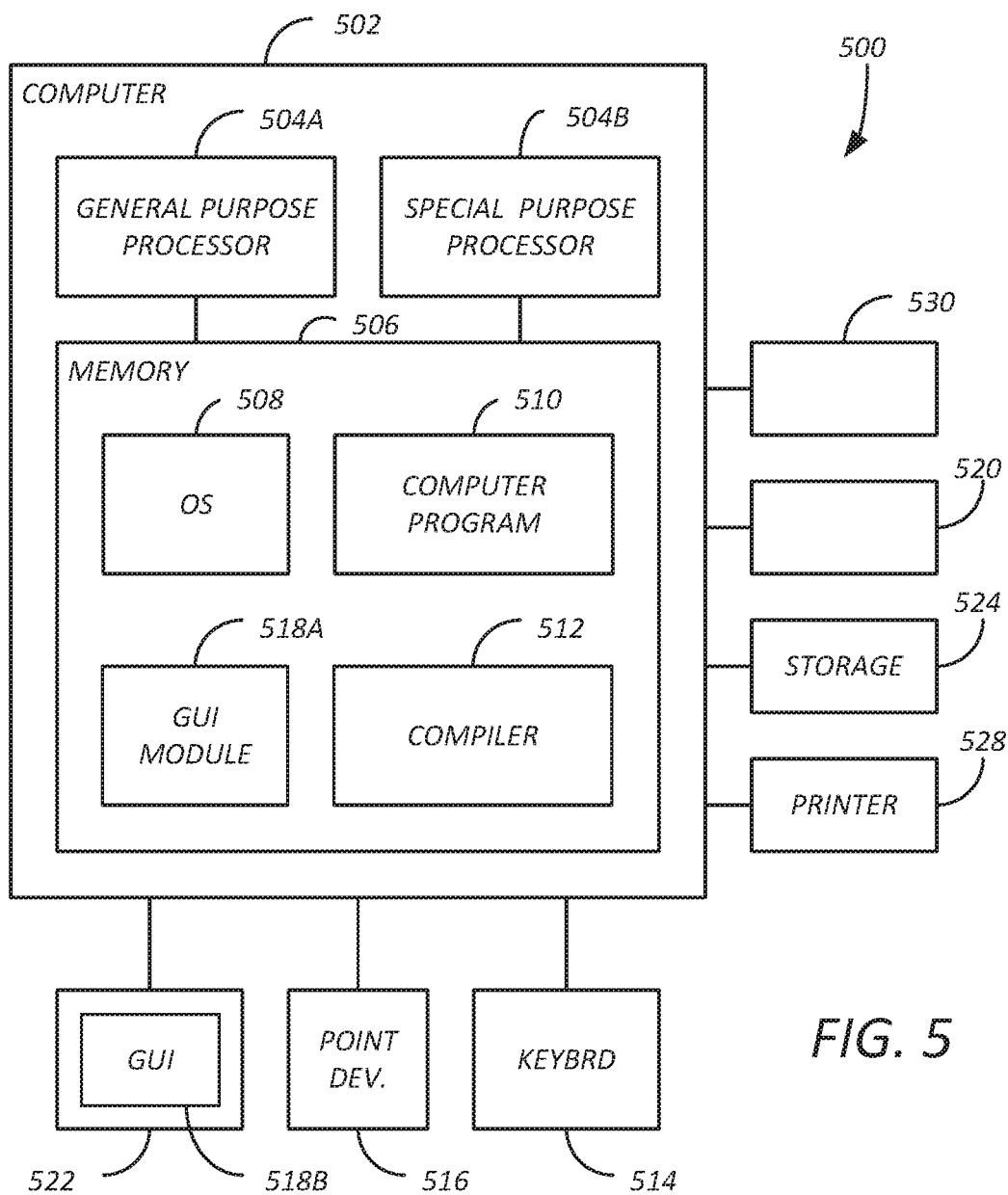
FIG. 5 illustrates an exemplary computer system that could be used to implement processing elements of the geolocation system.

FIG. 5 illustrates an apparatus 500 that could be used to implement processing elements of the above disclosure, including the client 102, web server 104, the application 106, and the CA headend 108. The computer 502 comprises a processor 504 and a memory, such as random access memory (RIM) 506. The computer 502 is operatively coupled to a display 522, which presents images such as windows to the user on a graphical user interface 518B. The computer 502 may be coupled to other devices, such as a keyboard 514, a mouse device 516, a printer 528, etc. Of course, those skilled in the art will recognize that any combination of the above components, or any number of different components, peripherals, and other devices, may be used with the computer 502.

Generally, the computer 502 operates under control of an operating system 508 stored in the memory 506, and interfaces with the user to accept inputs and commands and to present results through a graphical user interface (GUI) module 518A. Although the GUI module 518B is depicted as a separate module, the instructions performing the GUI functions can be resident or distributed in the operating system 508, the computer program 510, or implemented with special purpose memory and processors. The computer 502 also implements a compiler 512 which allows an application program 510 written in a programming language such as COBOL, C++, FORTRAN, or other language to be translated into processor 504 readable code. After completion, the application 510 accesses and manipulates data stored in the memory 506 of the computer 502 using the relationships and logic that was generated using the compiler 512. The computer 502 also optionally comprises an external communication device such as a modem, satellite link, Ethernet card, or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the operations herein described. Computer program 510 and/or operating instructions may also be tangibly embodied in memory 506 and/or data communications devices 530, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

The foregoing discloses an apparatus, method and system for securely and bi-directionally transmitting information including conditional access private data between a client and a headend, the method including establishing a hypertext transfer protocol secure (https) connection. The method also includes upgrading the https connection to a persistent bi-directional connection. The method also includes accepting a first message from the client via the persistent bi-directional connection, wherein the first message includes an identifier of the client. The method also includes parsing the first message for the identifier of the client. The method also includes associating the identifier of the client with the persistent bi-directional connection. The method also includes transmitting a second message notifying the headend of the persistent bi-directional connection, the second message including the identifier of the client.

Implementations may include one or more of the following features:

Any of the methods described above, wherein establishing an https connection includes transmitting an https connect message from the client to a web server.

Any of the methods described above, wherein the persistent bi-directional connection is a secure web socket connection.

Any of the methods described above, wherein the method further includes upstreaming the secure web socket connection to a server side application.

Any of the methods described above, wherein the first message further includes a state of the client, and may also include wherein the second message further includes the state of the client.

Any of the methods described above, wherein a server side application manages the secure web socket connection.

Any of the methods described above, wherein the method further includes receiving an entitlement request via the secure web socket connection.

Any of the methods described above, wherein the method also includes looking up the identifier of the client based upon the secure web socket connection.

Any of the methods described above, wherein the method also includes providing the entitlement request received via the secure web socket connection and the identifier of the client to the headend, receiving an entitlement response from the headend, looking up the secure web socket connection based upon the identifier of the client, and providing the entitlement response to the client via the secure web socket connection.

Another embodiment is evidenced by a an apparatus for securely and bi-directionally transmitting information including conditional access private data between a client and a headend, the apparatus including: a processor, a memory, communicatively coupled to the processor, the memory including processor instructions including instructions for performing the above-described methods in the disclosed combinations.

CONCLUSION

This concludes the description of the preferred embodiments of the present disclosure The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of securely and bi-directionally transmitting information comprising conditional access private data between a client and a headend, the method comprising:
   establishing a hypertext transfer protocol secure (HTTPs) connection;
   upgrading the HTTPs connection to a persistent bi-directional connection;
   accepting a first message from the client via the persistent bi-directional connection, wherein the first message comprises an identifier of the client;
   parsing the first message for the identifier of the client;
   associating the identifier of the client with the persistent bi-directional connection; and
   transmitting a second message notifying the headend of the persistent bi-directional connection, the second message comprising the identifier of the client.

2. The method of claim 1, wherein establishing an HTTPs connection comprises transmitting an HTTPs connect message from the client to a web server.

3. The method of claim 1 wherein the persistent bi-directional connection is a secure web socket connection.

4. The method of claim 3, further comprising upstreaming the secure web socket connection to a server side application.

5. The method of claim 3, wherein:
   the first message further comprises a state of the client; and
   wherein the second message further comprises the state of the client.

6. The method of claim 3, wherein a server side application manages the secure web socket connection.

7. The method of claim 3, further comprising:
   receiving an entitlement request via the secure web socket connection;
   looking up the identifier of the client based upon the secure web socket connection;
   providing the entitlement request received via the secure web socket connection and the identifier of the client to the headend;
   receiving an entitlement response from the headend;
   up the secure web socket connection based upon the identifier of the client; and
   providing the entitlement response to the client via the secure web socket connection.

8. An apparatus for securely and bi-directionally transmitting information comprising conditional access private data between a client and a headend, the apparatus comprising:
- a processor;
- a memory, communicatively coupled to the processor, the memory comprising processor instructions comprising instructions for:
  - establishing a hypertext transfer protocol secure (HTTPs) connection;
  - upgrading the HTTPs connection to a persistent bi-directional connection;
  - accepting a first message from the client via the persistent bi-directional connection, wherein the first message comprises an identifier of the client;
- parsing the first message for the identifier of the client;
- associating the identifier of the client with the persistent bi-directional connection; and
- transmitting a second message notifying the headend of the persistent bi-directional connection, the second message comprising the identifier of the client.

9. The apparatus of claim 8, wherein establishing an HTTPs connection comprises transmitting an HTTPs connect message from the client to a web server.

10. The apparatus of claim 8 wherein the persistent bi-directional connection is a secure web socket connection.

11. The apparatus of claim 10, further comprising upstreaming the secure web socket connection to a server side application.

12. The apparatus of claim 10, wherein:
first message further comprises a state of the client; and
wherein the second message further comprises the state of the client.

13. The apparatus of claim 10, wherein a server side application manages the secure web socket connection.

14. The apparatus of claim 10, further comprising:
- receiving an entitlement request via the secure web socket connection;
- looking up the identifier of the client based upon the secure web socket connection;
- providing the entitlement request received via the secure web socket connection and the identifier of the client to the headend;
- receiving an entitlement response from the headend;
- looking up the secure web socket connection based upon the identifier of the client; and
- providing the entitlement response to the client via the secure web socket connection.

* * * * *